United States Patent [19]

Tsukamoto

[11] Patent Number: 5,493,656
[45] Date of Patent: Feb. 20, 1996

[54] MICROCOMPUTER WITH DYNAMIC BUS CONTROLS

[75] Inventor: Takashi Tsukamoto, Kodaira, Japan

[73] Assignees: Hitachi, Ltd.; Hitachi Microcomputer Engineering Ltd., both of Tokyo, Japan

[21] Appl. No.: 437,152

[22] Filed: May 2, 1995

Related U.S. Application Data

[63] Continuation of Ser. No. 270,811, Jul. 5, 1994, abandoned, which is a continuation of Ser. No. 55,230, Apr. 28, 1993, Pat. No. 5,341,481, which is a continuation of Ser. No. 573,456, Aug. 27, 1990, abandoned.

[30] Foreign Application Priority Data

Sep. 11, 1989 [JP] Japan .................................. 1-235446

[51] Int. Cl.$^6$ .............................. G06F 13/00; G06F 13/36
[52] U.S. Cl. ......................... 395/280; 395/824; 364/231; 364/240; 364/240.2; 364/240.5; 364/238; 364/284; 364/284.2; 364/259; 364/259.2; 364/DIG. 1
[58] Field of Search ..................................... 395/325, 275, 395/425, 800; 370/85.1; 340/825.06

[56] References Cited

U.S. PATENT DOCUMENTS

| | | | |
|---|---|---|---|
| 4,447,878 | 5/1984 | Kinnie et al. ........................ | 395/325 |
| 4,449,184 | 5/1984 | Pohlman, III et al. ............... | 395/250 |
| 4,495,574 | 1/1985 | Hofstetter ............................ | 395/325 |
| 4,523,274 | 6/1985 | Fukunaga et al. ................... | 395/325 |
| 4,580,213 | 4/1986 | Hulett et al. ........................ | 395/325 |
| 4,590,556 | 5/1986 | Berger et al. ....................... | 395/700 |
| 4,658,350 | 4/1987 | Eggebrecht et al. ................ | 395/425 |
| 4,683,534 | 7/1987 | Titejen et al. ....................... | 395/325 |
| 4,752,871 | 6/1988 | Sparks et al. ....................... | 395/800 |
| 4,831,514 | 5/1989 | Turlakov et al. .................... | 395/500 |
| 4,965,723 | 10/1990 | Kirk et al. ............................ | 395/325 |
| 4,983,236 | 1/1991 | Butts, Jr. et al. .................... | 395/375 |
| 5,014,186 | 5/1991 | Chisholm ............................ | 395/275 |
| 5,045,998 | 9/1991 | Begun et al. ........................ | 395/325 |
| 5,055,661 | 10/1991 | Gochi .................................. | 235/492 |
| 5,109,490 | 4/1992 | Arimilli et al. ..................... | 395/325 |
| 5,109,492 | 4/1992 | Noguchi et al. .................... | 395/325 |
| 5,113,369 | 5/1992 | Kinoshita ............................ | 395/325 |
| 5,113,497 | 5/1992 | Dewa .................................. | 395/275 |
| 5,148,539 | 9/1992 | Enomoto et al. ................... | 395/425 |
| 5,214,767 | 5/1993 | Wanner et al. ..................... | 395/425 |
| 5,274,795 | 12/1993 | Vachon ............................... | 395/500 |

FOREIGN PATENT DOCUMENTS

| | | | |
|---|---|---|---|
| 0036185 | 9/1981 | European Pat. Off. ........ | G06F 13/00 |
| 0187293 | 7/1995 | European Pat. Off. ........ | G06F 13/42 |
| 62-232061 | 1/1987 | Japan .............................. | G06F 13/36 |
| 62-75867 | 4/1987 | Japan .............................. | G06F 13/36 |
| 62-232062 | 10/1987 | Japan .............................. | G06F 13/36 |
| 63-296158 | 12/1988 | Japan .............................. | G06F 13/36 |
| 1-31252 | 2/1989 | Japan .............................. | G06F 13/36 |

OTHER PUBLICATIONS

Enger, "Range Check of an Address Counter", *IBM Technical Disclosure Bulletin*, V. 16, No. 7, Dec. 1973, pp. 2136–2137.

Minami, "Introduction of 32-Bit Microprocessor", CQ Publisher K.K., pp. 84–87.

"Microcomputer Series 14, 6800 Microprocessor", Maruzen Inc., Mar. 30, 1983, pp. 18–19 and 26–27.

"Hitachi 16-bit Microprocessor HD641016 User's Manual", Hitachi, Ltd., Sep. 1987., pp. 428–432.

*Primary Examiner*—Gopal C. Ray
*Attorney, Agent, or Firm*—Fay, Sharpe, Beall, Fagan, Minnich & McKee

[57] ABSTRACT

A microcomputer includes one or more registers therein. These registers are provided for defining a specific address area. When a processor unit in the microcomputer accesses an address in the specific address area, it acknowledges the access to change the bus width and/or bus cycle of the microcomputer dynamically.

11 Claims, 9 Drawing Sheets

<WRITE CYCLE>

<READ CYCLE>

MICROCOMPUTER WITH DYNAMIC BUS CONTROLS

This is a continuation of application Ser. No. 08/270,811, filed Jul. 5, 1994, now abandoned, which was a continuation of U.S. Ser. No. 08/055,230, filed Apr. 28, 1993, now U.S. Pat. No. 5,341,481, which was a continuation of U.S. Ser. No. 07/573,456, filed Aug. 27, 1990, now abandoned.

BACKGROUND OF THE INVENTION

The present invention relates generally to a microcomputer and, more particularly, to a single chip microcomputer comprising a data processing system together with a system resource having different data bus sizes or cycles.

In order to improve the general-purpose properties of a microcomputer to be developed, there are taken counter-measures for enhancing the general-purpose properties of either the internal functions or the external interface functions of the microcomputer.

In order to enhance the general-purpose properties of the internal functions of the microcomputer, the following counter-measures are taken. The internal memory to be programmed is made of an electrically programmable read only memory (as will be referred to as "EPROM"). The number of bits in the general-purpose registers themselves to be packaged in the microcomputer are increased. The internal peripheral circuits of the microprocessor may include a free running timer, an analog-to-digital converter, a pulse width modulation (i.e.,. PWM) timer, a serial communication interface circuit or a direct memory access controller.

In order to enhance the external interface functions, a wait control circuit is packaged in the microprocessor so as to facilitate an interface with a low speed memory such as a dynamic random access memory.

A dynamic bus sizing function is given to the microprocessor. The dynamic bus sizing function gives the microcomputer dynamically a 4-bit interface or an 8-bit interface. This allows a data exchange between an external device having a data bus width with an intrinsic 4 or 8 bits and an external microcomputer of 16-bit interface i.e., the number of external data terminals is 16 bits. In other words, the function to selectively change the bus sizing operations dynamically according, to the various external conditions is called the dynamic bus sizing function.

This dynamic bus sizing function is important for dropping the cost of a data processor system having the microcomputer and for augmenting the degree of freedom for designing the aforementioned data processor system.

The present invention has been conceived in the course of enhancing the general-purpose properties of the aforementioned dynamic bus sizing function and pursuing high-speed operations.

SUMMARY OF THE INVENTION

An object of the present invention is to provide a microcomputer enabled to change the bus size dynamically at a high speed while retaining general-purpose properties; and to provide a method for the microcomputer to follow.

Another object of the present invention is to provide a microcomputer enabled to change not only the bus sizes but also the bus cycles dynamically; and to provide a method for the microcomputer to follow.

The foregoing and other objects and novel features of the present invention will become apparent from the following description to be made with reference to the accompanying drawings.

In a microcomputer, there are one or packaged more registers, by which a specific area can address be accessed. The microprocessor itself acknowledges the access, if any, to the address in the specific address area, and changes the data bus width of microcomputer dynamically.

The microprocessor itself acknowledges whether or not the address to be accessed is the specific address area set in the aforementioned registers, and can change the bus width dynamically at a high speed and with the general-purpose properties.

Moreover, the bus controller of the microcomputer comprises: a first address register for addressing an address area (or range) for which a bus width is to be changed; a second address register for addressing an address area (or range) for which a bus cycle is to be changed; and comparison means for comparing the individual address areas addressed by said first and second address registers and an address signal outputted from a bus master such as a central processing unit onto an internal address bus.

Thus, it is possible to acknowledge whether or not the address addressed by the address signal on the internal address bus is within the address area addressed by said first address register, whether or not the same is within the address area addressed by said second address register, or whether or not the same is within both the address areas addressed by said first and second address registers.

As a result, in the case where a data processing system comprising the microcomputer, as specified above, the degree of freedom for selecting a memory unit or a peripheral circuit to be incorporated into the aforementioned data processing system can be drastically improved. Thanks to this improvement in the degree of freedom for the selection, moreover, a lower cost memory unit or a peripheral circuit can be selected to drop the overall cost for the data processing system.

DESCRIPTION OF THE PREFERRED EMBODIMENTS

Figure 1A:
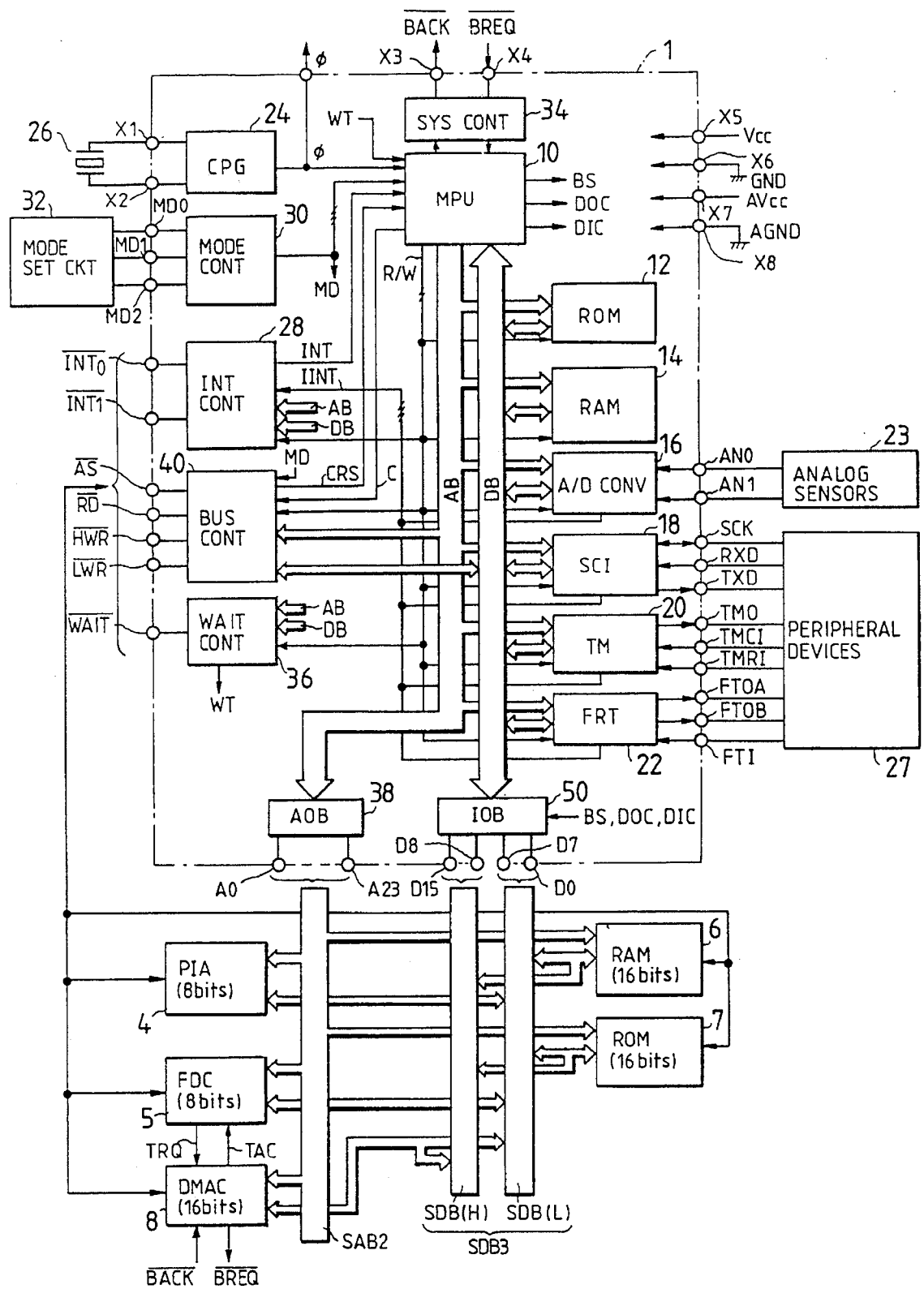
FIG. 1(a) is a block diagram showing a data processing system according to the present invention.

FIG. 1 shows a data processing system according to the present invention. As shown, a microcomputer 1 is formed in one semiconductor substrate of single-crystalline silicon or the like, as designated by single-dotted lines, by the well-known technology for forming a CMOS system. The microcomputer 1 is equipped with twenty four address output terminals A0 to A23 and sixteen input/output terminals D0 to D15, through which it is linked to an external address bus (SAB) 2 including twenty four signal lines and an external data bus (SDB) 3 including sixteen signal lines. In other words, the microcomputer 1 is designed on the basis of a 16-bit architecture such that the input/output bit number of data to the outside can be executed has a unit of 16 bits (i.e., 1 word). As is apparent from FIG. 1, the external data bus 3 is composed of an 8-bit external data bus SDB(H) of higher rank and an 8-bit external data bus SDB(L) of lower rank. Moreover: a peripheral interface adapter (PIA) 4 and a floppy disc controller (FDC) 5, which are designed on the basis of the 8-bit architecture; and an external random access memory (RAM) 6, an external read only memory (ROM) 7 and a direct memory access controller (DMAC) 8, which are designed on the basis of the 16-bit architecture, are linked to the microcomputer 1 through the aforementioned external address bus 2 and external data bus 3. In other words, the system resources (PIA4 and FDC5) having a data bus size different from the data bus size (i.e., 16 bits) of the microcomputer 1 are packaged in the data processing system. As a result, this microcomputer 1 includes a later-described bus controller (BUS CONT) 40 into which the dynamic data bus sizing function is incorporated.

First of all, the internal blocks of the microcomputer 1 will be described in the following.

A microprocessor unit MPU 10 includes: an execution unit having a variety of 16-bit registers such as a 16-bit arithmetic logic unit (ALU) or a program counter; and a sequence control unit for controlling the operations of the execution unit. The sequence control unit includes: a macro instruction register for holding a macro instruction; a macro instruction decoder for decoding the output of the macro instruction register; a micro ROM adapted for control by the outputs of the macro instruction decoder and having a plurality of micro instructions; and a micro instruction decoder for decoding the micro instructions outputted from the micro ROM to control the operations of the aforementioned execution unit. Incidentally, in case one macro instruction is to be executed, the micro ROM is accessed at first by the outputs of the macro instruction decoder. Then, the micro ROM is accessed on the basis of the next address data in a next address field of the micro instructions outputted from the micro ROM. In other words, in order to execute one macro instruction, one or plural micro instructions are sequentially read out from the micro ROM.

The aforementioned microcomputer 1 further comprises internal modules: a 16-bit output read only memory (ROM) 12 for storing a data processing program; a 16-bit input/output random access memory (RAN) for providing operation areas for the aforementioned CPU 10 and storing data; an analog-to-digital converter (A/D CONV) 16 for converting analog signals to digital data; a serial communication interface circuit (SCI) 18 for converting either serial data inputted from the outside of the microcomputer 1 to parallel data or internal data of the microcomputer 1 to serial data to output them to the outside of the microcomputer 1; a timer (TM) 20; and a free running timer (FRT) 22.

The aforementioned A/D converter 16 receives input signals from analog sensors 23 such as temperature sensors, which are disposed outside of the microcomputer 1, through external terminals AN0 and AN1 to convert the analog signal inputted to the external terminal AN0 or AN1 to a digital signal in accordance with a program. The A/D converter 16 includes therein an 8-bit data register for storing the converted digital data and a control register for controlling the operations of the A/D converter 16. This control register is made to have a storage capacity of 8 bits for example, and a predetermined address, and can be read and written by the MPU 10. On the other hand, the aforementioned data register has a predetermined address so that the data stored therein are read out by the access of the MPU 10.

The aforementioned serial communication interface (SCI) 18 is linked to a peripheral device 27 through a serial clock input/output terminal SCK, a serial data input terminal RXD and a serial data output terminal TXD. In case the serial communication interface (SCI) 18 is in a clock synchronization mode, for example, it outputs serial data (or transfer data) to the aforementioned terminal TXD in synchronism with the aforementioned transfer clock while outputting the transfer clock through the aforementioned terminal SCK. In response to the serial data, on the other hand, the aforementioned SCI 18 receives the reception clock inputted at the aforementioned terminal SCK and the serial data (or reception data) synchronized with the reception clock through the terminal RXD. The SCI 18 is exemplified by including a readable 8-bit reception data register, readable/writable 8-bit transmission data register and a readable/writable 8-bit control register, all of which are adapted to be accessed by the MPU.

The aforementioned timer (TM) 20 is linked to the peripheral device 27 through a timer output terminal TMO, a timer clock input terminal TMCI and a timer reset input terminal TMRI. The timer (TM) 20 includes therein an 8-bit counter and an 8-bit readable/writable time constant register. For example, the counter counts either at the rise, break, or at the edge of the rise/break of an external clock inputted to the terminal TMCI. The counted value of the counter is compared with the time constant data which is set in the time constant register by the MPU 10. In case the comparison finds out a coincidence, the timer (TM) 20 outputs a coincidence signal (or a compare match signal) to the terminal TMO. The counted value of the counter can be reset, if necessary, with a clear signal to be applied to the aforementioned terminal TMRI. The timer (TM) 20 includes a readable/writable 8-bit control register to be accessed by the MPU so as to control the operations of the timer (TM) 20.

The aforementioned free running timer (FRT) 22 is linked to the peripheral device 27 through output compare signal output terminals FTOA and FTOB and an input capture signal input terminal FTI. The timer FRT 22 includes a 16-bit free running counter, readable/writable 16-bit first and second output compare registers, a readable 16-bit input capture register, a readable/writable 8-bit timer control register, and a readable/writable 8-bit timer status register. Incidentally, the 16-bit register is adapted to be read or written for every 8 bits by the MPU 10. In case pulses having a duty ratio of 50% are to be output ted in an arbitrary phase from the terminals FTOA and FTOB, both the upper limit value (e.g., "A000" in the hexadecimal notation) of the counted value of the free running counter and the half value (e.g., "5000" in the hexadecimal) of the upper limit data of the free running counter are written in the first and second output compare registers, respectively, by the MPU 10. Moreover, the counter clear bit of the timer status register is set, and the free running counter is reset with the value ("A000") in the first output compare register. As a result, the pulse signal outputted from the terminal FTOA is made so periodic that it is given a high level for a time period from a reset to a subsequent reset of the free running counter and a low level for a time period from the subsequent reset to a further subsequent reset. On the other hand, the pulse signal to be outputted from the terminal FTOB has its output level inverted each time the value ("5000") of the second output compare register and the counted value of the free running counter match each other. Thus, the two pulse signals to be outputted from the terminals FTOA and FTOB have a duty ratio of 50% and are out-of phase by 90 degrees.

In response to the signal inputted to the terminal FTI, moreover, the counted value of the free running counter is set in the input capture register. The MPU 10 is enabled to measure the period or width of the pulses by reading out the counted value which is set in the input capture register.

Thus, each of the peripheral circuits (e.g., A/D CONV, SCI, TM and FRT) packaged in the microcomputer 1 has a register which can be accessed by the MPU 10. Predetermined different addresses are assigned to those individual registers. Predetermined addresses are naturally assigned to the storage areas in the internal ROM 12 and RAM 14 and the various registers in the MPU 10. As a result, the predetermined individual addresses are assigned to the address spaces of the MPU 10.

The microcomputer 1 has the following components. A clock pulse generator MPG generates a variety of clock pulses for controlling the operation timing of the MPU 10 and the operations of the internal peripheral modules (e.g., A/D CONV 16, SCI 18, TM 20 and FRT 22). The CPG 24 is connected with the quarts oscillator 26, for example, through external terminals X1 and X2 and generates a system clock φ of 10 MHz by halving the frequency of the original frequency (e.g., 20 MHz) generated from the quarts oscillator 26. For simplicity of illustrations, there is shown only the system clock φ to be fed to the MPU 10. As a matter of fact, however, the CPG 24 further generates clock pulses (φ/2 to φ/4096) for the peripheral modules 16, 18, 20 and 22.

An interrupt controller (INT CONT) 28 receives both interrupt requests, which are inputted from the PIA4 and the DMAC 16 through external terminals INT0 and INT1, and an internal interrupt request IINT, which is inputted from the peripheral modules 16, 18, 20 and 22, to generate an interrupt request INT to the MPU 10. The INT CONT 28 includes a readable/writable 8-bit priority control register and responds to one of a higher rank of plural interrupt requests, if any, in accordance with a predetermined priority.

In response to the interrupt request INT, the MPU 10 is shifted from an ordinary data processing mode (i.e., an operation mode according to the program the ROM 12) to an interrupt processing routine to execute the interruption to the interrupt request.

A mode controller (MODE CONT) 30 is linked through external terminals MD0, MD1 and MD2 to a mode setting circuit (MODE SET CKT) 32 and acknowledges the voltage level (e.g., a high or low level) of the terminals MD0 to MD2 set by the mode setting circuit 32 to generate a mode signal MD for the MPU 10 and the later-described bus controller 40. In other words, the mode controller 30 can acknowledge eight combinations of voltage levels of the individual terminals MD0, MD1 and MD2. However, the microcomputer 1 has five kinds of operation modes, i.e, a single chip mode, extended minimum modes 1 and 2, and extended maximum modes 3 and 4, all of which are acknowledged by the aforementioned mode controller 30. The mode signal MD is deemed to contain five signals in correspondence to the five kinds of modes.

Figure 1B:
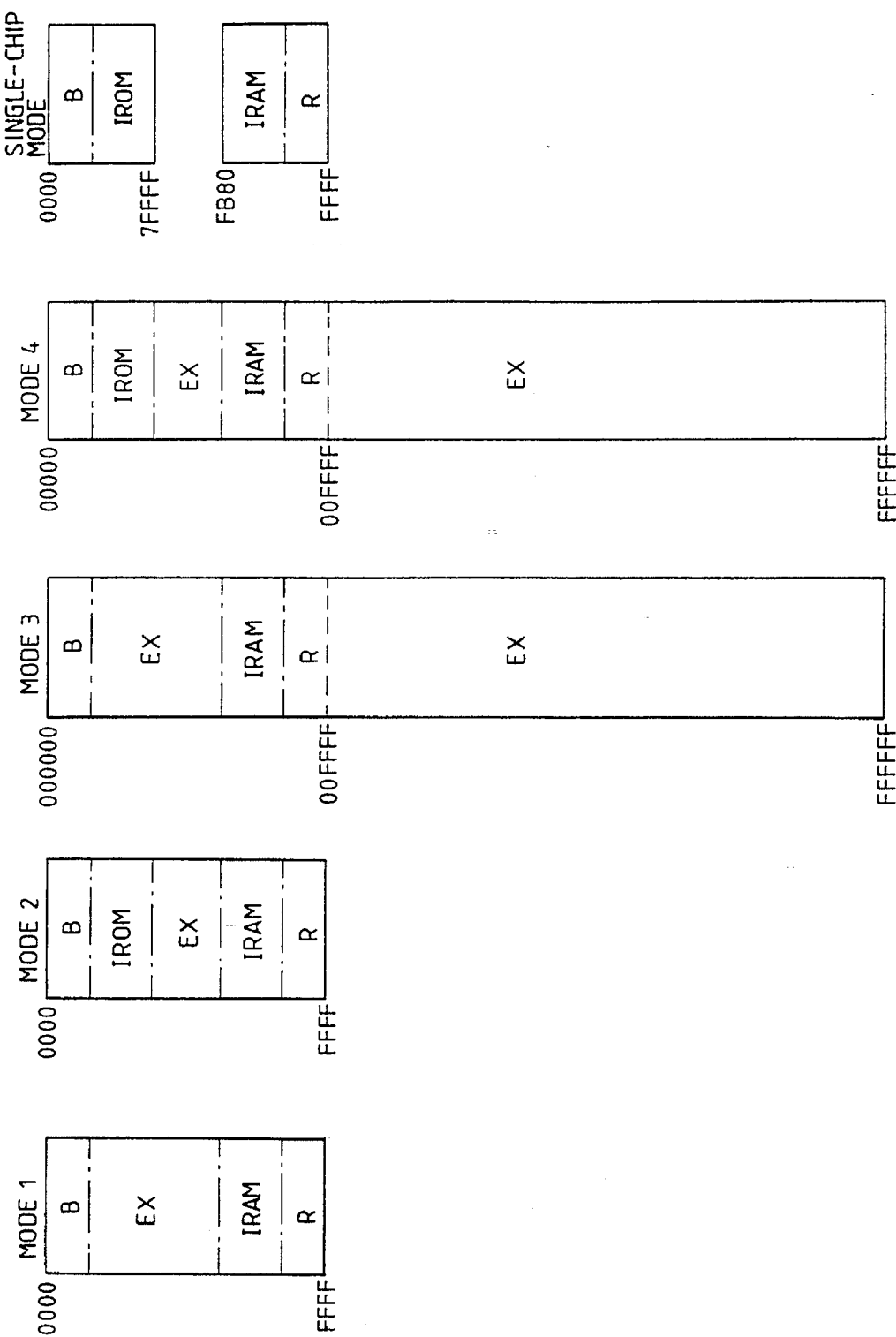
FIG. 1(b) is a memory map showing a microcomputer according to the present invention.

FIG. 1(b) is a memory map of an address space enumerating the aforementioned five kinds of modes. In FIG. 1(b): letter R designates address areas of the aforementioned or later-described various in registers the internal blocks 16, 18, 20, 22, 28, 36 and 40; letters IRAM designate address areas of the RAM 14; letters IROM designate address areas of the ROM 12; letters EX designate address areas of the external memories (RAM 6 and ROM 7) and various registers in the external peripheral circuits (PIA 4, FDC 5 and DMAC 8) which can be accessed by the microcomputer 1; and letter B designates vector access for interrupt and exceptional processings. Incidentally, in case the microcomputer 1 is not equipped with the ROM 12 and RAM 14, its operation modes are the aforementioned modes 1, 2, 3 and 4, and the IRAM and IROM in FIG. 1(b) are address areas EX. In FIG. 1 (b), moreover, the first and last addresses of the address areas are expressed in the hexadecimal notation.

The microcomputer 1 shown in FIG. 1(a) further includes the following components.

A system controller (SYS CONT) is linked to the DMAC 8 through external terminals X3 and X4 and to the MPU 10. This SYS CONT 34 controls whether or not a bus acknowledgment $\overline{BACK}$ is to be generated to the DMAC 8, when the DMAC generates a bus request $\overline{BREQ}$ in response to a data transfer request TRQ from the FDC 5. The DMAC issues a data transfer acknowledgment TAC to the FDC 5, when it receives the bus acknowledgment, to execute the direct memory access. In short, the SYS CONT 34 has a bus arbiter function.

A wait state control let (WAIT CONT) 35 is linked through an external terminal $\overline{WAIT}$ to the low-speed external device (FDC5 or ROM 7). The WAIT CONT 36 includes an 8-bit control register which can be read and written by the MPU 10. The WAIT CONT 36 is provided for facilitating the interface between the aforementioned low-speed external device and the microcomputer 1 and outputs a wait signal WT to the MPU 10 so as to elongate the bus cycle by inserting a predetermined number of wait states into the bus cycle. The aforementioned register is provided for selecting the wait modes and the wait state number. The wait modes include: a programmable wait mode in which wait states of a number selected when the MPU 10 accesses the external address space are inserted into the bus cycle; a terminal wait mode in which wait states of a number selected when the MPU 10 accesses the external address space are inserted into the bus cycle and in which the wait states are continuously inserted till the aforementioned terminal $\overline{\text{WAIT}}$ is raised from the low level to the high level; and an auto-wait mode in which wait states of a number selected only when the terminal $\overline{\text{WAIT}}$ is at the low level are inserted into the bus cycle. Incidentally, it is deemed that the applications of the WAIT CONT 36 relating to the terminal wait mode and the auto-wait mode are described.

An address output buffer (AOB) 38 has a function to output an address signal, which is outputted from the MPU 10 acting as the bus master and received through the internal address AB, to the external address bus SAB through the address output terminals A0 to A23.

A data input/output buffer (IOB) 50 outputs the data on the internal data bus DB to the external data bus SDB through the data input/output terminals D0 to D15 or inputs the data on the external data bus SDB, through the data input/output terminals D0 to D15, to the internal data bus. The data input/output buffer 50 has its operations controlled by control signals BS, DOC and DIC which are outputted from the MPU 10.

Terminals X5 and X6 are fed with the operation voltages Vcc at 5 volts or the like and GND at 0 volts or the like of the microcomputer 1, and terminals X7 and X8 are fed with reference voltages AVcc and AGND of the A/D CONV 16.

The bus controller (BUS CONT) 40 is linked to the external peripheral circuits 4, 5, 6, 7 and 8 through external terminals $\overline{\text{AS}}$, $\overline{\text{RD}}$, $\overline{\text{HWR}}$ and $\overline{\text{LWR}}$ to generate: an address strobe signal, a read signal, a higher byte write signal, and a lower byte write signal. This is in response to a control signal C coming from the MPU 10 when the MPU 10 accesses the external address space. The bus controller 40 includes: a timing signal generator for generating the address strobe signal, the read signal, the higher byte write signal and the lower byte write signal on the basis of the aforementioned control signal C; and an address detector for changing the data bus size.

Figure 2:
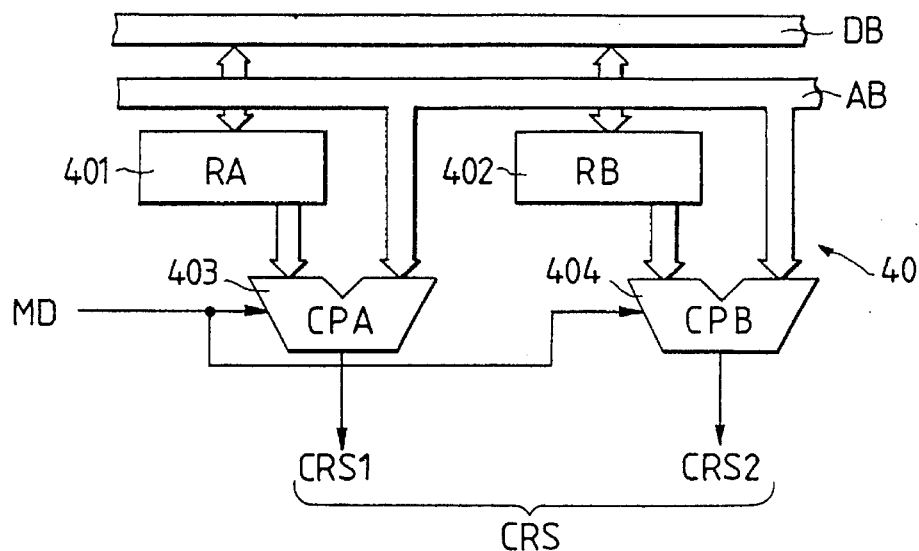
FIG. 2 is a block diagram showing a portion of data bus controller according to the present invention.

FIG. 2 shows the detector in the bus controller 40 which has a circuit structure, as will be described in the following.

Figure 3:
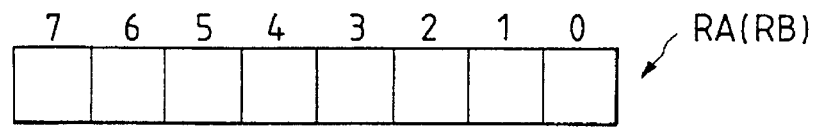
FIG. 3 is a diagram showing a bit structure of the address register RA (or RB) of FIG. 3.

Registers (RA) 401 and (RB) 402 individually are used for addressing the address areas. These registers RA and RB can be made to have a storage capacity of 8 bits, i.e., an 8-bit structure. This structure of the register RA or RB is shown in FIG. 3.

These registers RA and RB are assigned with specific addresses like the various registers owned by the MPU 10 and are connected with the internal data bus DB. As a result, an arbitrary address area can be addressed by writing the registers RA and RB from the MPU 10.

The address information held in the register RA is inputted to a comparator CPA 403. The address information held in the register RB is inputted to the comparator CPB 404. The comparators CPA and CPB have their other inputs fed through the internal address bus AB with the address signal to be accessed by the MPU 10. The comparators CPA and CPB compare the address information set in the registers RA and RB and the address signal on the internal address bus to output comparison result signals CRS1 and CRS2. These result signals are transmitted to the MPU 10 to discriminate from the comparison output result CRS of the two comparators CPA and CPB whether or not the external address to be accessed belongs to the specific address area whose boundary area is defined by the registers RA and RB. This discrimination result is reflected upon the control signal BS.

The IOB 50 is interposed between the internal data bus DB and the external data bus (or system bus) SDB. This IOB 50 performs a bus width change, as will be described hereinafter, in response to the aforementioned control signal (or bus width select signal) BS.

The aforementioned mode signal MD is fed to the comparators CPA and CPB. When the minimum extension modes 1 and 2 are designated with the mode signal MD, for example, the address bus AB outputs a 16-bit address signal to the outside to enable the MPU 10 to access an area of about 64 Kbytes. When the maximum extension modes 3 and 4 are designated with the mode signal MD, the address bus AB outputs a 24-bit address to enable the MPU to access an area of about 16 Mbytes.

In case the area addressing registers RA and RB have an 8-bit width, as described above, the corresponding comparators CPA and CPB input an 8-bit width. As a result, when the modes 1 and 2 are designated, the address signal of 8 bits, which is inputted to the comparators CPA and CPB, is the higher 8 bits (i.e., 8th to 15th) of the address signal of 16 bits. In other words, the area addressing unit for the registers RA and RB to address is 256 bytes. If a common address information is inputted to the registers RA and RB, for example, it is used as the higher 8-bit address for addressing the area of 256 bytes.

When the modes 3 and 4 are designated, on the contrary, the 8-bit address signal to be inputted to the comparators CPA and CPB is the higher 8 bits (i.e., 16th to 23rd) of the address signal of 24 bits. In other words, the area addressing unit for the registers RA and RB to address is about 64 Kbytes. If a common address information is inputted to the registers RA and RB, for example, it is used as the higher 8-bit address for addressing the area of about 64 Kbytes. The bit structure of the registers RA and RB should not be limited to that shown in FIG. 3 but may be made to have 24 bits, respectively; According to the structure of FIG. 3, however, the cost for the microcomputer 1 can be dropped.

Figure 4:
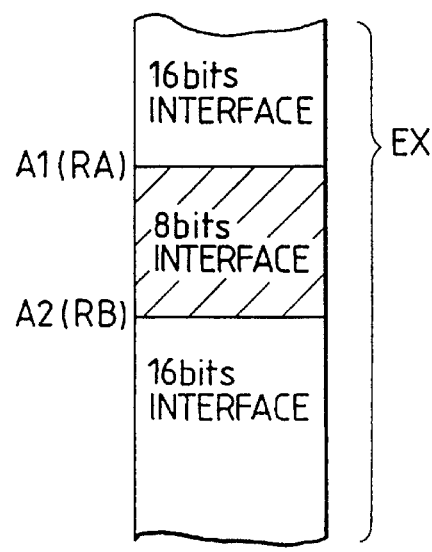
FIG. 4 is a memory map showing an address area including an 8-bit/16-bit interface, which is set by using the data bus controller of FIG. 2.

FIG. 4 is a conceptional diagram showing the address space to be designated by the aforementioned registers. Incidentally, the letters EX appearing in FIG. 4 are construed to indicate the letters EX in the memory map relating to the modes 1 to 4 shown in FIG. 1(b).

If the address A1 is designated by the register RA and if the address A2 is designated by the register RB, the area from the address A1 to the address A2 is set, as hatched in FIG. 4. When the address designation from the address A1 to the address A2 is executed, the MPU decides whether or not the aforementioned area is designated from the comparison outputs of the aforementioned comparators CPA and CPB. If the address is in the designated area, a control signal BS is generated to make a change to the interface through the 8-bit bus. Otherwise, the interface is the bus interface of 16 bits.

The advantage of the method and system thus far described is that an external device having an 8-bit architecture can be freely adopted in the data processing system even in the case where the external address area is in the middle of the memory map.

Figure 5:
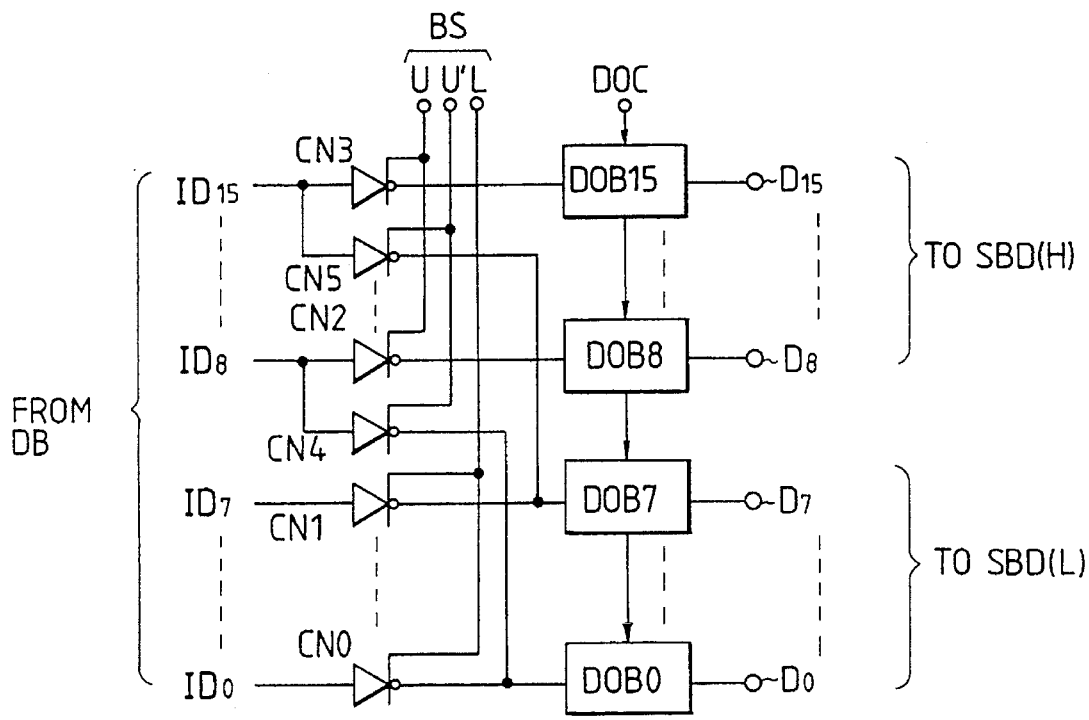
FIG. 5 is a circuit diagram showing one example of the output circuit of a data input/output buffer according to the present invention.

FIG. 5 is a circuit diagram showing one embodiment of the output line of the input/output buffer IOB 50 having the aforementioned bus width changing function.

Upstream of the output circuits DOB0 to DOB15 for transmitting signals ID0 to ID15 of the internal data bus DB to the external terminals D0 to D15, there is disposed a multiplexer which is constructed of a clocked inverter (i.e., a three-state output circuit), although not necessarily limited thereto. In other words, the signals ID0 to ID7 of the internal data bus DB are fed to the inputs of the corresponding output circuits DOB0 to DOB7 through clocked inverters CN0 to CN1.

On the other hand, the higher 8-bit signals ID8 to ID15 of the internal data bus DB are fed on one hand to the inputs of DOB8 to DOB15 (corresponding to the higher 8 bits of the 16-bit bus width) through clocked inverters CN2 and CN3, as illustrated as representatives, and on the other hand to the inputs of the output circuits DOB0 to DOB7 (corresponding to the 8-bit bus width) through clocked inverters CN4 and CN5, as illustrated as representatives.

A control signal L is fed to the control terminals of the aforementioned clocked inverters CN0 and CN1. A control signal U is fed to the control circuits of the aforementioned clocked inverters CN2 and CN3. A control signal U' is fed to the control terminals of the clocked inverters CN4 and CN5. These individual clocked inverters CN0 to CN5 are rendered operative, when the corresponding control signals L, U and U' are at the high level (i.e., the logic "1"). They are brought into an output high-impedance state when the corresponding control signals L, U and U' are at the low level (i.e., the logic "0").

On the other hand, the output circuits DOB0 to DOB15 have their operations control led with the output control signal DOC outputted from the MPU 10. When the data is outputted as in the write cycle of the memory, for example, the output control signal DOC is raised to the high level. Accordingly, the output circuits DOB0 to DOB15 are rendered operative to output the write data or the like generated by the MPU 10. When, on the contrary, the data is inputted as in the read cycle of the memory, the output control signal DOC is dropped to the low level. Accordingly the output circuits DOB0 to DOB15 are brought into the output high-impedance state "Z" so that the data input circuit of FIG. 6 is rendered operative to input the data from a system bus ADB.

Figure 6:
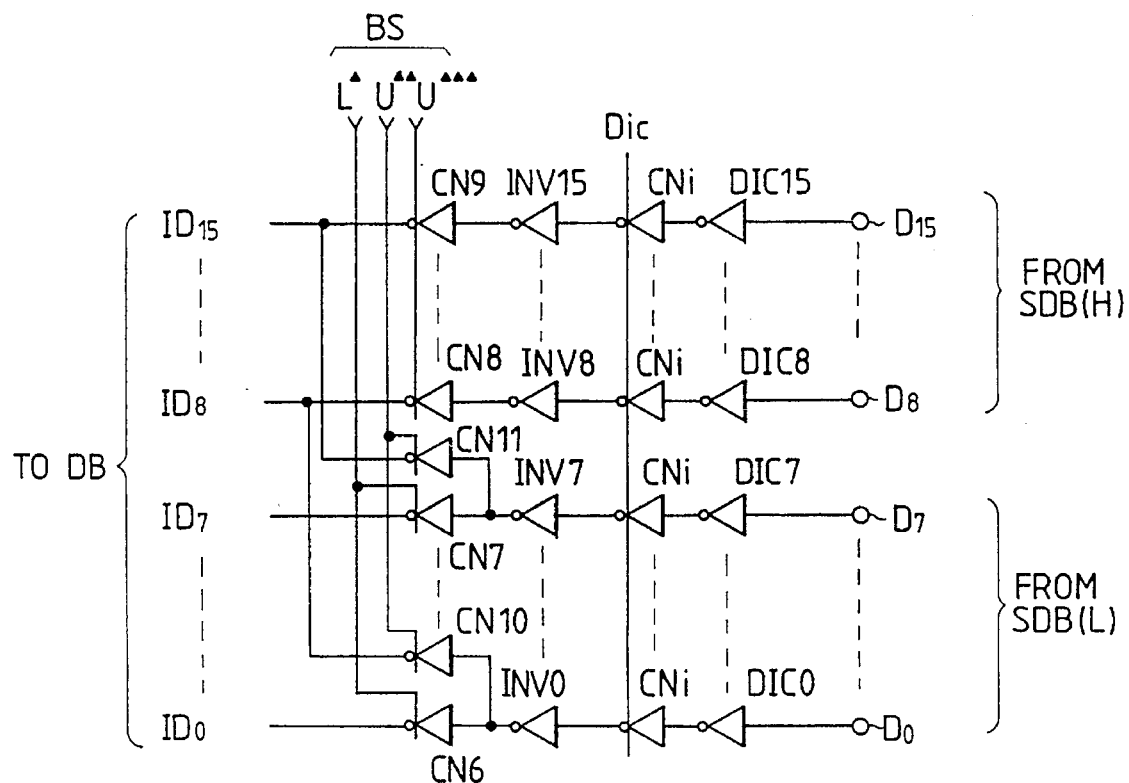
FIG. 6 is a circuit diagram showing one example of the input circuit of a data input/output buffer according to the present invention.

FIG. 6 shows one embodiment of the input line the input/output buffer IOB 50.

Clocked inverters CNi are disposed downstream of the input circuits DIC0 to DIC15 which are made receptive of the signals of the external data buses SDB(H) and SDB(L) at their inputs. In the read cycle as when these clocked inverters CNi receive the input control signals DiC at their control gates, e.g., when the clocked inverters read data from the outside, the MPU 10 outputs the input control signal DiC at the high level to render the clocked inverters CNi conductive. At this time, the MPU 10 simultaneously outputs the output control signal DOC at the low level so that the outputs of the output circuits DOB0 to DOB15 are brought into the high-impedance state ("Z").

The outputs of the aforementioned inverters CNi are linked to the internal data bus DB through both inverters INV0 to INV15 and a multiplexer including the clocked inverters CN5 to CN11.

The clocked inverters CN6 to CN9 in the multiplexer transmit the data on the external terminals D0 to D15 as the internal data ID0 to 1D15 to the internal data bus DB. On the other hand, the clocked inverters CN10 and CN11 transmit the data on the external terminals D0 to D7 as the internal data ID8 to ID15 to the higher 8 bits of the internal data bus DB.

In case the 16-bit bus interface is taken, the control signals L' and U'" to be impressed upon the control terminals of the aforementioned inverters CN6 to CN9, are raised to the high level (i.e., the logic=1) to render the individual inverters CN6 to CN9 conductive. Also, the control signal U" to be impressed upon the control terminals of the aforementioned inverters CN10 and CN11, is dropped to the low level (i.e., the logic=0) to bring the outputs of the inverters CN10 and CN11 into the high-impedance state ("Z") .

In case the 8-bit bus interface is taken, on the other hand, the control signals L', U" and U'" are caused to take either the high, low and low levels; or the low, high, and low levels, respectively.

Figure 7:
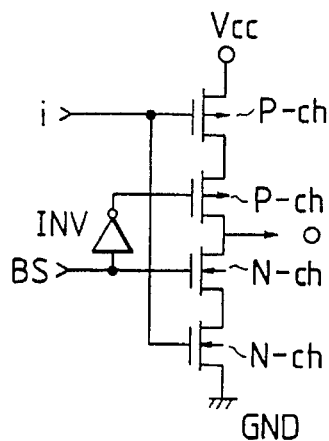
FIG. 7 is a circuit diagram showing one example of a clocked inverter circuit.
Figure 8:
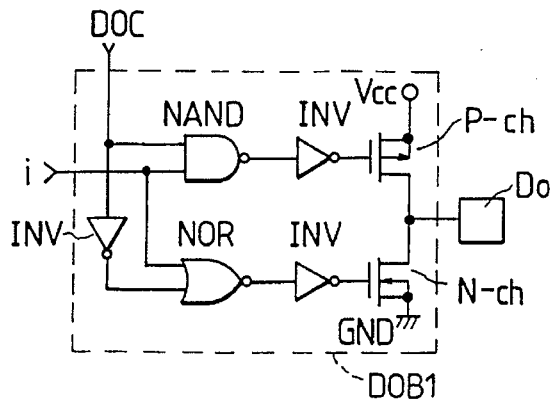
FIG. 8 is a circuit diagram showing one example of the output buffer circuit of FIG. 5.

FIG. 7 shows a circuit example of the clock inverters CN shown in FIGS. 5 and 6. FIG. 8 shows a circuit example of the output circuit DOB1 of FIG. 5. Both of these circuits are constructed of CMOS circuits containing P-ch MOSFETs and N-ch MOSFETs. The operations of these circuits will not be described because they seem well known to those skilled in the art.

Figure 9:
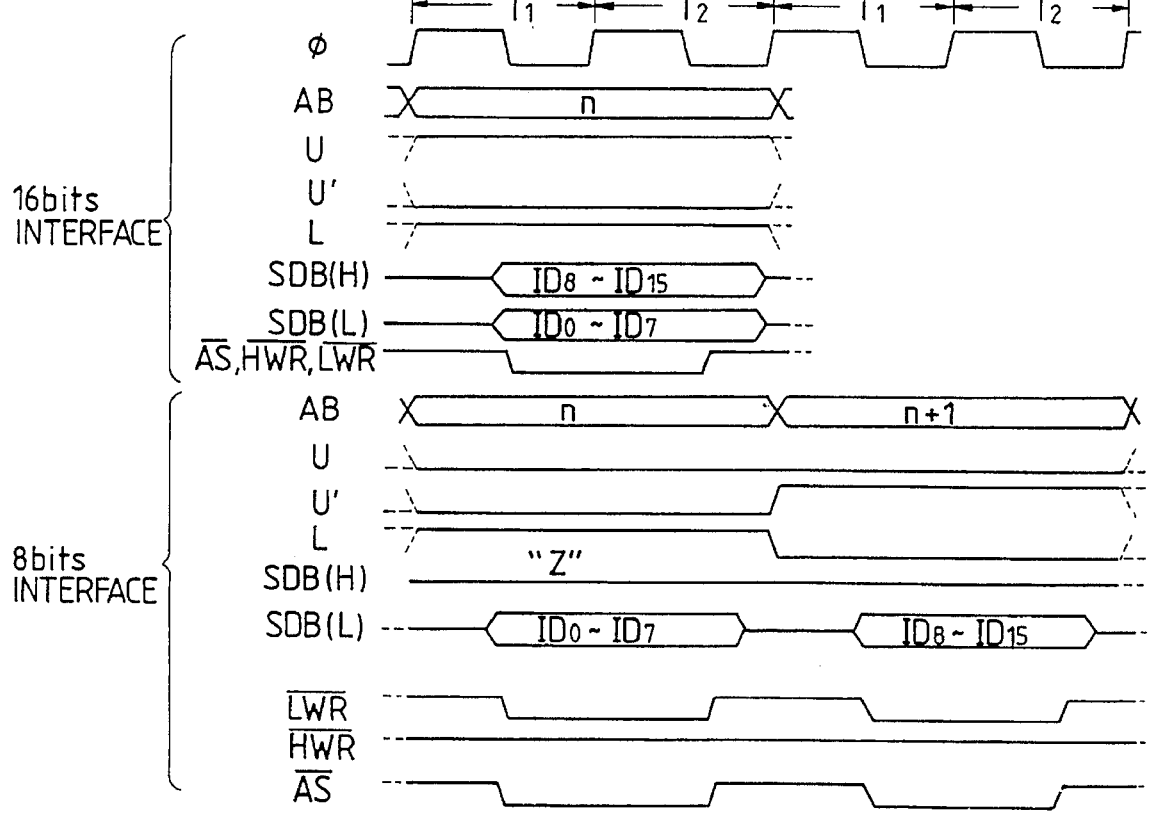
FIG. 9 is a timing chart showing a write cycle of a 16-bit/8-bit interface according to the present invention.

FIG. 9 is a timing chart showing the operations of the write cycle of the aforementioned input/output buffer IOB shown in FIG. 5. The MPU 10 output's an address signal n (corresponding to an address in the bus interface area of 16 bits) as shown in FIG. 4, to the internal address bus AB in case it is going to access said address. The MPU 10 acknowledges from the outputs of the comparators CPA and CPB that the address belongs to the bus width area of 16 bits. As a result, the MPU 10 sets, as the control signals BS, the control signals U and L to the logic "1" and the control signal U' to the logic "0". Then, the aforementioned clocked inverters CN0 and CN1, and CN2 and CN3 are rendered operative. As a result, the lower 8-bit signals ID0 to ID7 on the internal data bus DB are transmitted to the inputs of the output circuits DOB0 to DOB7 through the clocked inverters CN0 and CN1, as illustrated as representatives. The higher 8-bit signals ID8 to ID15 of the internal data bus DB are simultaneously transmitted to the inputs of the output circuits DOB8 to DOB15 through the clocked inverters CN2 and CN3, as illustrated as representatives. As a result, in response to the output control signal DOC and in accordance with the operation states of the output circuits DOB0 to DOB15, the 16-bit data composed of the ID0 to ID7 and ID8 to ID15 are transmitted in one write cycle containing first and second states T1 and T2 to external data buses SDB(H) and SDB(L) of 16-bit width through the output terminals D0 to D15. At this time, both the higher byte write signal $\overline{HWR}$ and the lower byte write signal $\overline{LWR}$ are dropped in the second state T2 to the low level to inform an external device such as a memory of the fact that the write cycle has the 16-bit data.

In case, on the other hand, the MPU 10 is going to access the address in the bus interface area of 8 bits, as shown in FIG. 4, it outputs the address signal n corresponding to the aforementioned internal address bus AB. From the outputs of the comparators CPA and CPB, the MPU 10 acknowledges that the address belongs to the bus width area of 8 bits. As a result, the MPU 10 sets, as the control signals BS, the signal L to the logic "1" and the signals U and U' to the logic "0" in the first write cycle. As a result, only the aforementioned clocked inverters CN0 and CN1 are rendered operative. Thus, the lower 8-bit signals ID0 to ID7 of the internal data bus DB are transmitted to the inputs of the output circuits DOB0 to DOB7 through the c locked inverters CN0 and CN1, as illustrated as representatives. As a result, in response to the output control signal DOC and in accordance with the operation states of the output circuits DOB0 to DOB15, the data composed of 8 bits ID0 to ID7 is transmitted through the output terminals D0 to D7 to the external data bus SDB(L) (the lower 8 bits of the external data bus SDB having the 16-bit width). At this time, the lower byte write signal $\overline{LWR}$ is set to the low level in the second state T2 and informs an external device such as FDC5 that the write cycle has the lower 8-bit data. The output terminals D8 to D15 corresponding to the external data bus SDB(H) of (the higher 8 bits of the external data bus SDB) are in the high impedance ("Z") state, as shown, in response to the high impedance of the outputs of the aforementioned clocked inverters CN2 to CN5. As a matter of fact, however, insignificant data are outputted because the output circuits DOB8 to DOB15 are operated by the output control signal DOC. Despite this fact, however, there arises no problem because the peripheral device to be accessed in this write cycle has the aforementioned bus interface of 8 bits. Therefore, the control terminals of the clocked inverters CN0 to CN3 may be shared and fed with the control signal L.

In a subsequent write cycle, the MPU 10 increments the address signal n on the internal address bus AB and sets the signal U' to the logic "1" and the signals L and U to the logic "0". Only the aforementioned clocked inverters CN4 and CN5 are rendered operative. As a result, the higher 8-bit signals ID8 to ID15 of the internal data bus DB are transmitted to the inputs of the output circuits DOB0 to DOB7 through the clocked inverters CN4 and CN5, as illustrated as representatives. In response to the output control signal DOC and in accordance with the operation states of the output circuits DOB0 to DOB15, the data of the remaining 8 bits ID8 to ID15 are transmitted during one write cycle through the output terminals D0 to D7 to the external data bus SDB(L) (the lower 8 bits of the external data bus SDB having a 16-bit width). At this time, the lower byte write signal $\overline{LWR}$ is set to the low level in the second state T2 informing a peripheral device such as FDC5 that the write cycle has the lower 8-bit data. Thus, in the area addressed by the aforementioned registers RA and RB, the data ID0 to ID15 of 16 bits outputted from the MPU 10 is written in the peripheral device during the two write cycles by the but interface of 8 bits.

Figure 10:
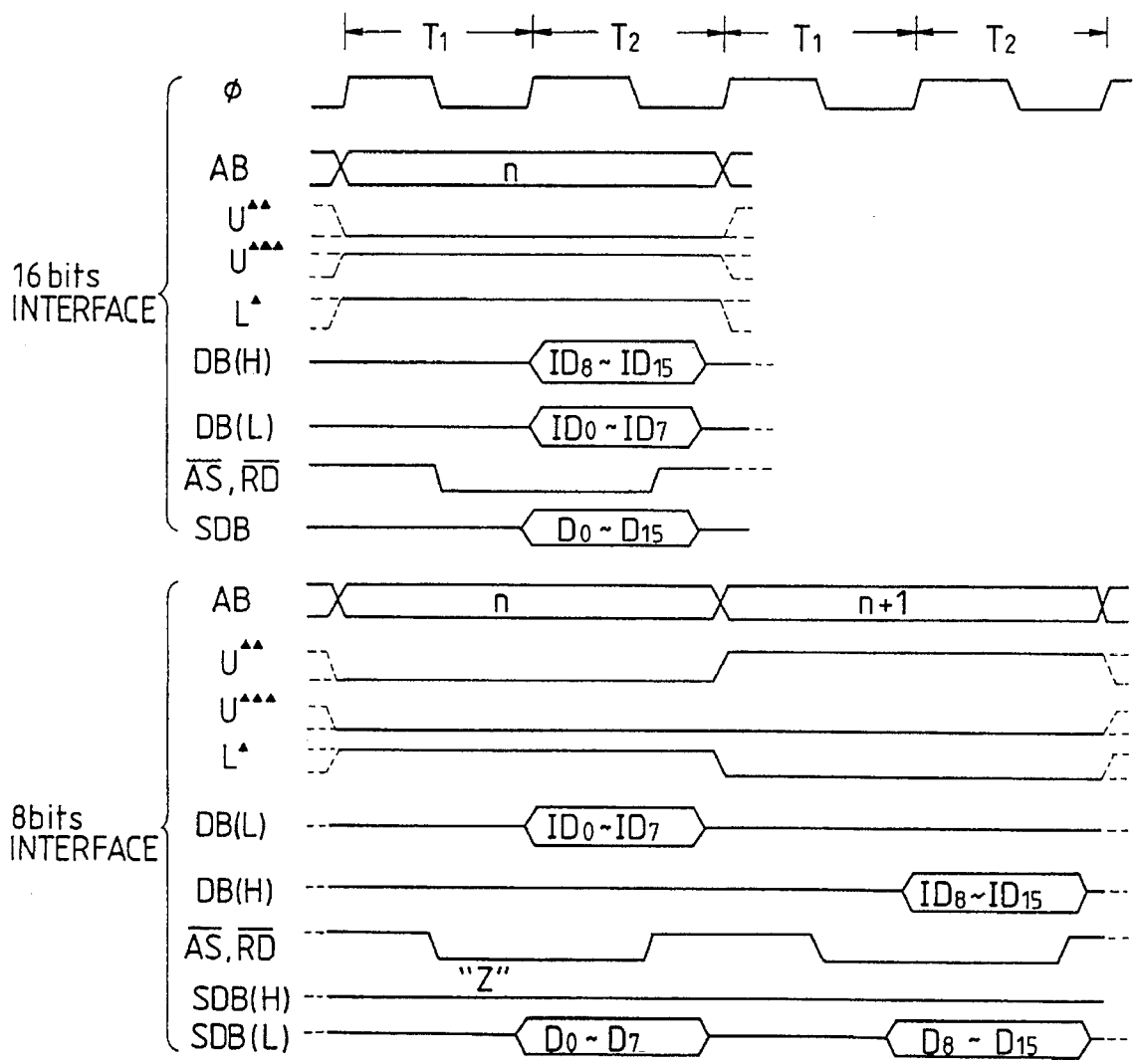
FIG. 10 is a timing chart showing a read cycle of a 16-bit/8-bit interface according to the present invention.

FIG. 10 is a timing chart showing the operations of the read cycle of the aforementioned input/output buffer IOB shown in FIG. 6.

In case the MPU 10 reads the data of 16 bits from the address n in the bus interface area of 16 bits shown in FIG. 4, it sets, as the control signals BS, the logic signals L' and U''' to the logic "1" and the logic signal U'' to the logic "0" on the basis of the outputs of comparators CPA and CPB. As a result, the aforementioned clocked inverters CN6 and CN7, and CN8 and CN9 of FIG. 6 are rendered operative. In response to the input control signal DiC, the 16-bit data on the external data bus SDB is transmitted through the external terminals D0 to D15 to the internal data buses DB(H) and DB(L).

In case, on the other hand, the 16-bit data are to be read by the MPU 10 from the 8-bit bus interface area shown in FIG. 4, the following operations are executed. In the first read cycle, the MPU 10 transmits the address signal n onto the internal address bus AB. After this, in accordance with the outputs of the comparators CPA and CPB, the MPU 10 sets, as the control signals BS, the control signal L7 to the logic "1" and the logic signals U'' and U''' to the logic "0". As a result, the aforementioned clocked inverters CN6 and CN7 of FIG. 6 are rendered operative. In accordance with the input control signal DiC, the 8-bit data of the lower external data bus. SDB(L) is transmitted through the external terminals D0 to D7 to the lower internal data bus DB(L). In a subsequent read cycle, the MPU 10 increments the address signal n on the internal address AB on the basis of the logic "0" of the signal U''' of the preceding cycle and sets the control signal U'' to the logic "1" and the control signals U''' and L' to the logic "0". As a result, the clocked inverters CN10 and CN11 of FIG. 6 are rendered operative. In accordance with the input control signal DiC, the 8-bit data on the external data bus SDB(L) is transmitted through the external terminals D0 to D7 to the higher internal data bus DB(H).

Since, according to the present embodiment, an arbitrary address information can be written in the registers RA and RB, the degree of freedom for the user to address the area is increased. Moreover, the present embodiment is effective for all the bus cycles, there is no restriction upon the specific instruction or the operation of the data transfer. Furthermore, the signals are decoded in the microprocessor, allowing the gate delay time (from the output of the address signal to the control signals BS) to be about 10 to 20 nsecs at the maximum. This high-speed access can be attained without any restriction upon the speed unlike the case in which the signals are to be decoded outside of the chip. In case a control circuit is to be provided for determining whether the 8-bit bus interface or the 16-bit bus interface is outside of the chip: it takes 30 nsecs for the address signal to be transmitted to the external address; it takes 10 nsecs to decode and compare the address signals; and it takes a setup time of 10 to 20 nsecs to input a signal such as the control signals BS to the external device. In short, a time of 50 nsecs or more is required.

The registers RA and RB may be those included in the bus controller or those of the internal RAM 14. Moreover, these registers RA and RB may be disposed in the execution unit in the MPU 10.

The following effects can be obtained from the embodiments thus far described:

(1) A specific address area is defined by boundaries set by the internal registers, and access to the specific address area is determined so that the data bus width can be accordingly changed dynamically. According to this structure, the microprocessor itself can identify whether an address is within the set specific address area. The microprocessor can then change the bus width accordingly at a high speed while retaining general-purpose properties.

(2) Since the bug width is changed by the aforementioned addressing, there can be attained an effect that the high general-purpose properties can be realized without any restriction upon the specific instruction or the data transfer.

(3) Thanks to the effect (1), there can be attained an effect that the system can be constructed by combining the microprocessor having an architecture of 16 bits and a peripheral device having an existing architecture of 8 bits.

Although our invention has been specifically described hereinbefore in connection with its embodiments, it should not be limited thereto but can naturally be modified in various manners within the gist thereof. For example, not only the bus size but also the bus cycle could be changed. If the system is constructed of a mixture of high- and low-speed memories, for example, an address space, to which the low-speed memories are assigned, is accessed by the registers RA and RB so that the bus cycle may be changed to the low-speed in accordance with the operation speed of the low-speed memory.

Figure 11:
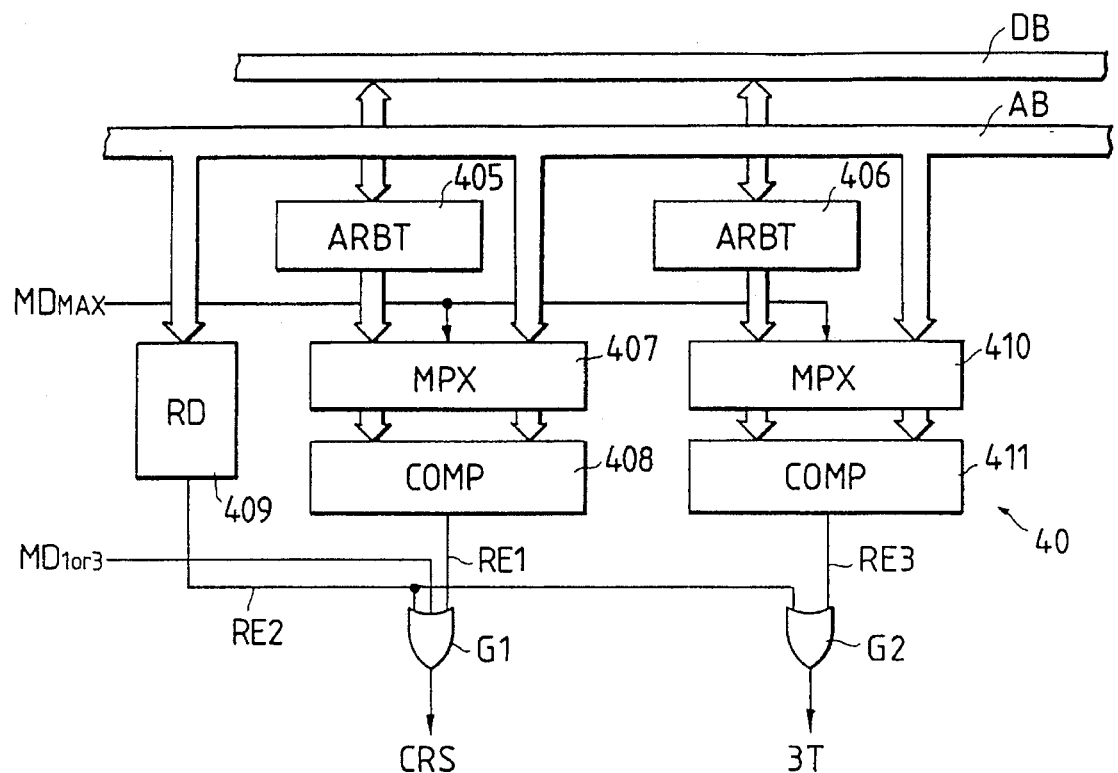
FIG. 11 is a block diagram showing a portion of another bus controller according to the present invention.

FIG. 11 shows an embodiment of a portion of an alternative bus controller 40 according to the present invention. This bus controller 40 includes an address register ARBT to be used for switching the data bus width and another address register AR3T to be used for changing the bus cycle. Thus, it executes two kinds of bus controls for changing the bus width and cycle dynamically and independently.

This embodiment to be described is one which is prepared by eliminating the ROM 12 and the RAM 14 from the microcomputer 1 of FIG. 1(a). In the embodiment shown in FIG. 1(b), the single chip mode is eliminated, and the address areas IROM and IRAM of the ROM 12 and the RAM 14 at the memory map in the modes 1 and 2 are replaced by the external address area EX. In other words, the minimum extension modes 1 and 2 have a common memory map, and the maximum extension modes 3 and 4 have a common memory map. As is apparent from the description of the bus controller of FIG. 11, however, the modes 1 and 3 are used especially for the 8-bit interface, and the modes 2 and 4 can be interchanged between the 8-and 16-bit interfaces. As a result, the degree of freedom for the user to design the data processing system is improved.

The bus controller 40 of FIG. 11 will be described in the following. This bus controller 40 includes an 8-bit readable/writable byte area top register (ARBT) 405 and an 8-bit readable/writable 3-state area top register (AR3T) 406.

The ARBT 405 is used in the modes 2 and 4 as an address register for setting the address of the boundary between the address space (or byte area) to be used as the 8-bit bus interface and the address space (or word area) to be used as the 16-bit bus interface. The ARBT 405 can be set at the unit of 64 Kbytes in the maximum extension mode 4 to store the higher 8 bits of the boundary address fed from the MPU 10 to the data bus DB. On the other hand, the ARBT 405 can be set at the unit of 4 Kbytes in the minimum extension mode 2 to store the higher 4 bits of the boundary address fed from the MPU 10 through the data bus DB.

A multiplexer (MPX) 407 feeds a comparator (COMP) 408 with both the address data stored in the ARBT 405 and the address signal fed onto the address bus AB from the MPU 10. In response to the maximum extension modes 3 and 4 output ted from the mode controller 30, the aforementioned MPX 407 feeds the aforementioned COMP 408 with the 8-bit address data stored in the ARBT 405 and the higher 8 bits of the address signal on the address bus AB. In response to the mode signal $MD_{MAX}$ at the low level indicating the minimum modes 1 and 2, on the other hand, the MPX 407 feeds the comparator with the 4-bit address in the ARBT 405 and the higher 4 bits of the address signal on the address bus AB.

The aforementioned COMP 408 compares the higher 8 bites (or higher 4 bits) of the boundary address data fed from the aforementioned MPX 407 and the higher 8 bits (or higher 4 bits) of the address signal on the address bus AB to output a comparison result signal RE1 at the high level when the address signal on the address bus AB is higher than the boundary address stored in the ARBT 40.

The aforementioned signal RE1 is fed to the first input of an OR Gate G1. The second input of the gate G1 is fed with a mode signal MD1 or MD3 indicating the minimum extension mode 1 or the maximum extension mode 3 outputted from the mode controller 30. The third input of the gate G1 is fed with the output signal RE2 of a detector 409.

This detector 409 is linked to the address bus AB to detect an address signal, which corresponds to one of the various registers in the internal blocks 16, 18, 20, 22, 28, 36 and 40 indicated at R in the memory map. The MPU 10 outputs the R address signal onto the address bus AB so as to access one of the registers. The detector feeds the output signal RE2 at the high level to the gate G1. Thus, in response to the signal RE2 at the high level, the mode signal MD1 or MD3 at the high level, or the signal RE1 at the high level, the gate G1 outputs to the MPU 10 an 8-bit data address request signal CRS at the high level instructing the 8-bit bus interface. As a result, the MPU 10 is controlled to take the 8-bit interface.

It should be noted here that the MPU 10 is controlled to take the 8-bit interface even for the predetermined address area R in the microcomputer 1.

Incidentally, the detector 409 can be designed by using the address registers RA and RB and the comparators CPA and CPB, for example, as shown in FIG. 2. However, the detector 409 may be exemplified by a circuit which is designed especially therefor by another method.

The aforementioned AR3T 406 is an address register for setting an address indicating the boundary between the address space to be accessed in two states and the address space to be accessed in three states. The AR3T 406 can be set at the unit of 64 Kbytes in the maximum extension modes 3 and 4 so as to store the higher 8 bits at the address of the boundary transferred from the MPU 10 through the data bus DB. In the minimum extension modes 1 and 2, on the other hand, the AR3T 406 can be set at the unit of 4 Kbytes so as to store the higher 4 bits of the boundary address which is transferred from the MPU 10 through the data bus DB.

The output of the AR3T 406 and the address data on the address bus are fed to the inputs of a multiplexer (MPX) 410 given a function like that of the foregoing MPX 407 and further to a comparator (COMP) 411.

This comparator 411 compares the address data in the AR3T 406 and the address signal on the address bus AB to output a comparison result signal RE3 at the high level when the address signal on the address bus is higher than the address data in the AR3T 406.

The signal RE3 is fed to the first input of an OR gate G2. The second input of the OR gate G2 is fed with the signal RE2 from the RD 409. Thus, the OR gate G2 outputs a 3-state bus access request signal 3T at the high level to the MPU 10 when it receives the signal RE2 at the high level or the signal RE3 at the high level.

Figure 12:
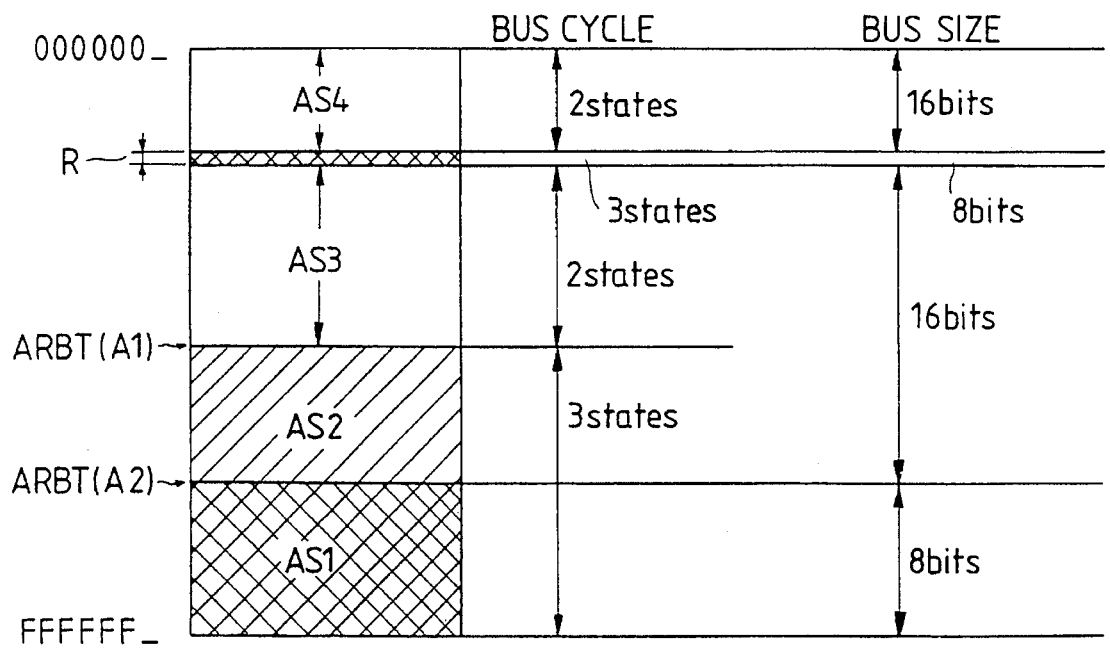
FIG. 12 is a diagram showing one example of an address space set by using the bus controller of FIG. 11.

FIG. 12 shows one example of the address space in the maximum extension mode 4, which is set by using the bus controller of FIG. 11. In brevity, the address space (AS1) higher than the address data A1 set in the ARBT 405 is used as the interface of the 8-bit data bus, whereas the address spaces (AS1 and AS2) higher than the address data A2 set in the AR3T 406 are used as the interfaces of a 3-state bus cycle. Thus: the address space (AS1) is used as the interface of the 8-bit bus and the 3-state bus cycle; the address space (AS2) is used as the interface of the 16-bit bus and the 3-state bus cycle; and the address spaces (AS3 and AS4) are used as the interfaces of the 16-bit bus and the 2-state cycle. Incidentally, the address spaces (R), i.e., the address spaces of the registers in the peripheral circuits 16, 18, 20, 22, 28, 36 and 40 are used as the interfaces of an 8-bit bus and the 3-state cycles independently of the aforementioned ARBT 405 and AR3T 406.

Figure 13A:
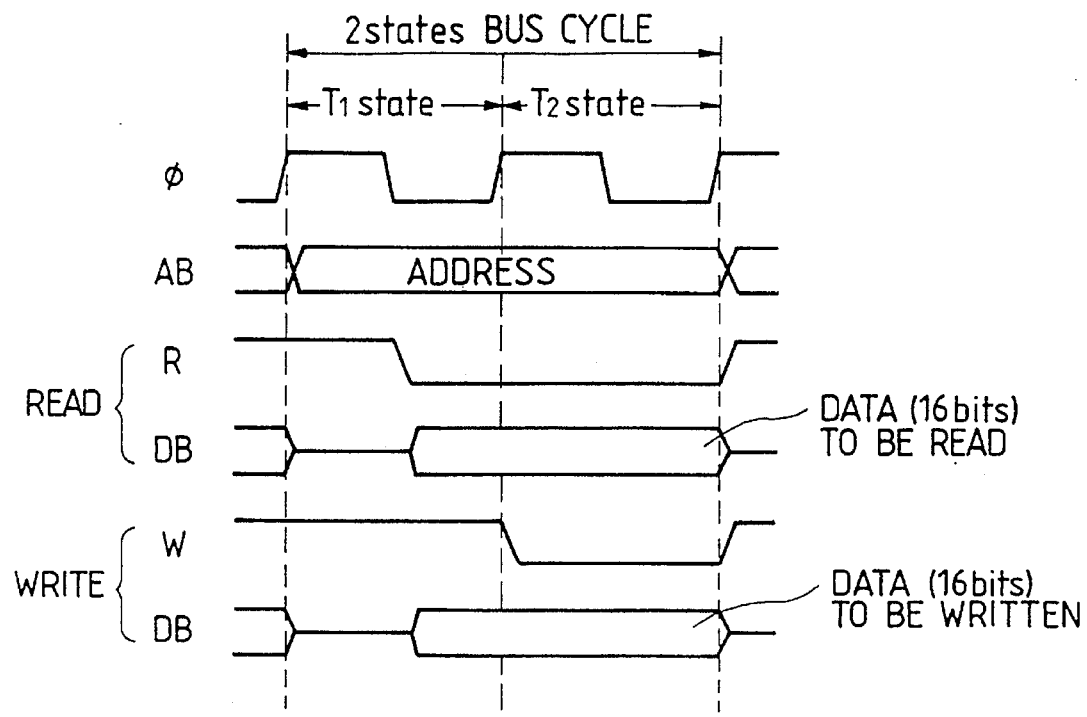
FIG. 13(a) is a timing chart showing a 2-state bus cycle and a 16-bit bus interface.

FIG. 13(a) is a timing chart in case the address space (i.e., a portion in the AS4) in the microcomputer 1 to be used as the 2-state bus cycle and the 16-bit bus interface is accessed by the MPU 10. Letter R designates an internal read signal to be outputted from the MPU 10 and a read mode when it is at the low level. Letter W designates an internal write signal to be outputted from the MPU 10 and a write mode when it is at the low level. Incidentally, the 2-state bus cycle is construed to mean the bus cycle in which the access for the read/write operation is completed for two clocks in the system clock φ, i.e., in the states T1 and T2.

Figure 13B:
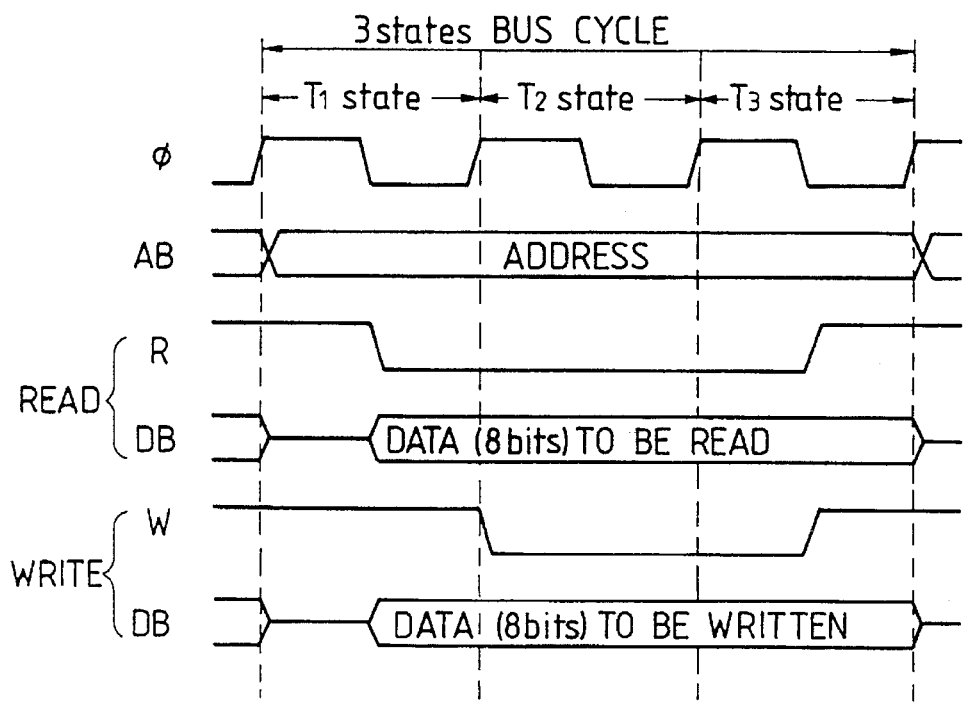
FIG. 13(b) is a timing chart showing a 3-state bus cycle and an 8-bit bus interface.

FIG. 13(b) is a timing chart in case the address space (R) in the microcomputer 1 to be used as the 3-state bus cycle and the 8-bit bus interface is to be accessed by the MPU 10. Since, in this case, the output signal RE2 of the detector RD of FIG. 11 is at the high level, both the outputs CRS and 3T of the gates G1 and G2 are raised to the high level. With this linkage and at the timing shown in FIG. 13(b), the MPU 10 accesses the address i n the address area (R). In FIG. 13(b), letter R designates the internal read signal, and letter W designates the internal write signal. Moreover, the 3-state bus cycle is construed to mean the bus cycle in which the access for the read/write operation is completed for three clocks in the system clock φ, i.e., in the states T1, T2 and T3.

The access to the address space (AS3) outside of the microcomputer 1, as shown in FIG. 12, is used as the 2-state bus cycle and the 16-bit bus interface, and its timing chart is referred to by the timing with the 16-bit interface of FIGS. 9 and 10. For example, the space (AS3) is assigned with the address of a high-speed memory such as the CMOS static RAN or the bipolar CMOS static RAM.

Figure 14:
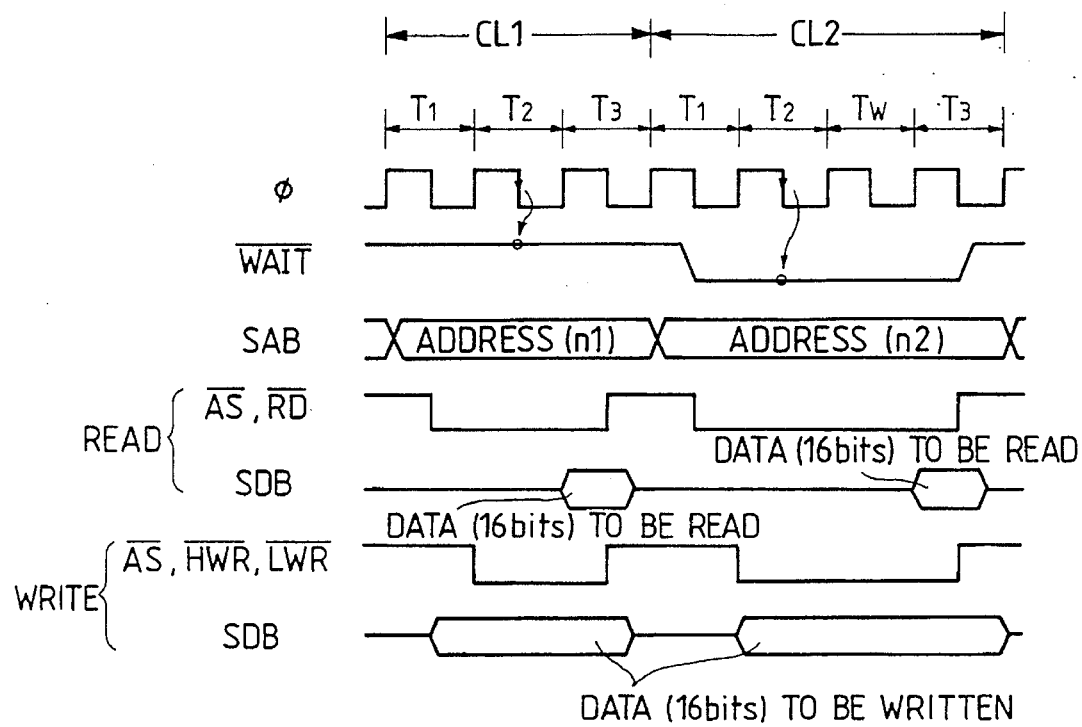
FIG. 14 is a timing chart showing a 3-state bus cycle and a 16-bit but interface.

FIG. 14 is a timing chart of a fist cycle CL1 in case the address space (AS2) outside of the microcomputer 1 is to be used as the 3-state bus cycle and the 16-bit bus interface is to be accessed by the MPU 10. FIG. 14 also illustrates a bus cycle CL2 including a wait state Tw to be inserted by the wait state controller 36. This wait state controller 36 is activated when it receives the 3-state access request signal 3T at the high level outputted from the bus controller 40 of FIG. 11. More specifically, the wait state controller 36 is activated, in the address state to be accessed in the 3-state bus cycle, to control the MPU 10 so that the wait states Tw of a predetermined number may be interposed between the states T2 and T3 in accordance with the operation mode.

In FIG. 14, letters $\overline{WAIT}$ are construed to indicate the voltage level of the external terminal $\overline{WAIT}$. The aforementioned wait state controller samples the voltage level of the external terminal $\overline{WAIT}$ at the breaking edge of the system clock φ in the state T2. The wait state Tw is not interposed between the states T2 and T3, in case the sampled voltage is at the high level, but interposed between the states T2 and T3 in case the sample voltage is at the low level. There is indicated at CL2 the bus cycle in which one wait state Tw is interposed between the states T2 and T3 in the auto-wait mode.

Incidentally, this address space (AS2) is assigned with the address of the ROM 7 or the like having a lower-speed address access time than that of the static RAM.

Figure 15:
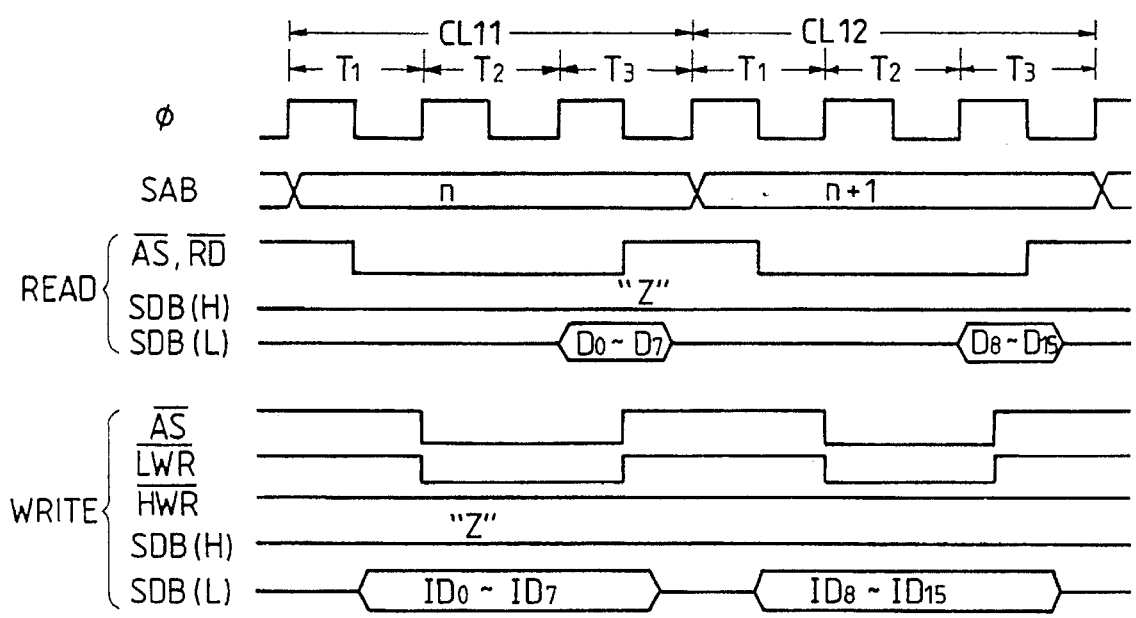
FIG. 15 is a timing chart showing a 3-state and 8-bit bus interface.

FIG. 15 is a timing chart in case the address space (AS1) outside of the microcomputer 1 to be used as the 3-state bus cycle and the 8-bit bus interface is accessed by the MPU 10. At the reading time, the lower 8-bit external data D0 to D7 are read out in the bus cycle CL11, and the higher 8-bit data D8 to D15 are read out in the subsequent bus cycle CL12, until both of them are read out of the external device selected with the addresses n and n+1 and are sequentially introduced into the microcomputer 1. At the writing time, on the other hand, the lower 8-bit internal data ID0 to ID7 are outputted in the bus cycle CL11, and the higher 8-bit internal data ID8 to ID15 are outputted in the subsequent bus cycle CL12, until both of them are outputted to the lower external data bus SDB(L) from the microcomputer 1 and introduced into the external device selected at the addresses n and n+1.

FIG. 12 shows the case in which the address data (A1) set in the ARBT 405 is larger than the address data (A2) set in the AR3T 406. In case, however, the address data (A1) are set in the AR3T 406 and the address data (A2) are set in the ARBT 405, the address space (AS2) is an area to be accessed in the 2-state bus cycle and with the 8-bit data bus interface. In this case, the address space (AS2) is accessed with the timing, as indicated as the 8-bit interface in FIGS. 9 and 10.

Thus, by adopting the bus controller 40 of FIG. 11, the bus cycle and size of the address space on the memory map can be set freely to some extent to improve the degree of freedom for design.

Incidentally, the foregoing description is directed to the example in which the data terminals of the 8-bit external peripheral devices 4 and 5 are connected with the lower 8-bit external data bus SDB(L). However, the present invention should not be limited thereto, but the data terminals of the 8-bit external peripheral devices 4 and 5 may be connected with the higher external data bus SDB(H). In this modification, the D0 to D15 of FIGS. 5 and 6 are rewritten to D15 to D0, and the ID0 to ID15 of FIGS. 5 and 6 are rewritten to ID15 to ID0.

In the timing chart of the 8-bit interface of FIG. 9, on the other hand, the lower external data bus SDB(L) is described to transfer the lower 8-bit internal data ID0 to ID7 at first and then the higher 8-bit internal data ID8 to ID15. However, the present invention should not be limited thereto but can be modified such that the IOB 50 is so controlled by the MPU 10 that the higher 8-bit internal data ID8 to ID15 may be transferred at first to the lower external data bus SDB(L) and that the lower 8-bit internal data ID0 to ID7 may then be transferred to the lower external data bus SDB(L). Incidentally, the structures of FIGS. 10 to 15 may also be modified in the aforementioned manners.

The present invention may be used in not only the microprocessor having the internal 16-bit structure but also a variety of general-purpose microprocessors having an 8- or 32-bit structure or a special processor.

The effects to be obtained from the representatives of the present invention disclosed herein will be briefly enumerated in the following. Specifically, a specific address area is defined by the internal registers, and this access to the specific address area is acknowledged so that the data bus width is accordingly changed dynamically. According to this structure, the microprocessor itself is enabled to: acknowledge whether the address is in the set specific address area, change the bus width accordingly at high speed, and still retain general-purpose properties.

What is claimed is:

1. A single-chip microcomputer formed on a single-chip, comprising:

an address bus;

external address terminals coupled to the address bus;

a data bus including first data lines and second data lines;

first and second external data terminals, a number of which is identical to that of the first and second data lines;

a processor unit which is coupled to the address bus and to the data bus and which provides an address signal to the address bus to access an address designated by the address signal, wherein the processor unit accesses an address in a predetermined address space; and a data circuit which is coupled to the address bus, to the data bus and to the first and second external data terminals and which includes:

a bus control circuit including a circuit which indicates a first address area in the predetermined address space and a detection circuit which detects whether or not the address signal provided from the processor unit designates an address in the first address area; and a data input/output circuit which couples each of the first data lines and the second data lines to the first external data terminals in sequence in response to the detection of the address in the first address area by the bus control circuit and which couples the first data lines and the second data lines to the first external data terminals and the second external data terminals, respectively, in response to no detection of the address in the first address area by the bus control circuit.

2. The single-chip microcomputer according to claim 1 wherein the data input/output circuit includes a data multiplexer circuit which is controlled by the processor unit when the bus control circuit provides the detection of the address in the first address area to the processor unit so that each of the first data lines and the second data lines are coupled to the first external data terminals in sequence and which is controlled by the processor unit when the bus control circuit provides the no detection of the address in the first address area to the processor unit so that the first data lines and the second data lines are coupled to the first external data terminals and the second external data terminals, respectively.

3. The single-chip microcomputer according to claim 2 wherein the detection circuit includes a comparator circuit which compares the address signal provided from the processor unit with the address in the first address area.

4. A single-chip microcomputer formed on a single-chip, comprising:

an address bus;

external address terminals coupled to the address bus;

a data bus including first data lines and second data lines;

first and second external data terminals, a number of which is identical to that of the first and second data lines;

a processor unit which is coupled to the address bus and to the data bus and which provides an address signal to the address bus to access an address designated by the address signal, wherein the processor unit accesses an address in a predetermined address space; and a data circuit which is coupled to the address bus, to the data bus and to the first and second external data terminals and which includes:

a bus control circuit including a first circuit which indicates a first address area in the predetermined address space and a first detection circuit which detects whether or not the address signal provided from the processor unit designates an address in the first address area;

a data input/output circuit which couples each of the first data lines and the second data lines to the first external data terminals in sequence in response to the detection of the address in the first address area by the bus control circuit and which couples the first data lines and the second data lines to the first external data terminals and the second external data terminals, respectively, in response to no detection of the address in the first address area by the bus control circuit; and a wait control circuit including a second circuit which indicates a second address area in the predetermined address space and a second detection circuit which detects whether or not the address signal provided from the processor unit designates an address in the second address area, wherein the processor unit accesses the address designated by the address signal in accordance with bus cycles having a predetermined number in response to detection of the address in the second address area from the second detection circuit and wherein the processor unit accesses the address designated by the address signal in accordance with bus cycles having a different number from the predetermined number in response to no detection of the address in the second address area from the second detection circuit.

5. The single-chip microcomputer according to claim 4 wherein the predetermined number of bus cycles is two states and the different number of bus cycles is three states.

6. The single-chip microcomputer according to claim 5 wherein the second detection circuit includes a comparator circuit which compares the address signal provided from the processor unit with the second address area.

7. The single-chip microcomputer according to claim 4 wherein the data input/output circuit includes a data multiplexer circuit which is controlled by the processor unit when the processor unit responds to the detection of the address in the first address area from the bus control circuit so that each of the first data lines and the second data lines are coupled to the first external data terminals in sequence and which is controlled by the processor unit when the processor unit responds to the no detection of the address in the first address area from the bus control circuit so that the first data lines and the second data lines are coupled to the first external data terminals .and the second external data terminals, respectively.

8. The single-chip microcomputer according to claim 7 wherein the first detection circuit includes a comparator circuit which compares the address signal provided from the processor unit with the address in the first address area.

9. A data processing system comprising:

a single-chip microcomputer having external address terminals, first external data terminals and second external data terminals;

an external address bus coupled to the external address terminals;

an external data bus including first external data lines coupled to the first external data terminals, respectively and second external data lines coupled to the second external data terminals, respectively;

a first external device coupled to the external address bus and to the first external data lines; and a second external device coupled to the external address bus and to the first and second external data lines, wherein the single-chip microcomputer further includes:

an internal address bus coupled to the external address terminals;

an internal data bus including first internal data lines and second internal data lines, a number of the first and second internal data lines being identical to that of the first and second external data terminals;

a processor unit coupled to the internal address bus and to the internal data bus, the processor unit providing an address signal to the internal address bus to access an address in a predetermined address space designated by the address signal, wherein the predetermined address space includes a first address area where an address of the first external device is assigned and a second address area where an address of the second external device is assigned; and a data circuit coupled to the internal address bus, to the internal data bus and to the first and second external data terminals and including:

a bus control circuit including a circuit which indicates the first address area in the predetermined address space and a detection circuit which detects whether the address signal provided from the processor unit designates an address in the first address area or in the second address area; and a data input/output circuit which couples each of the first internal data lines and the second internal data lines to the first external data terminals in sequence in response to the detection of the address in the first address area by the bus control circuit and which couples the first internal data lines and the second internal data lines to the first external data terminals and the second external data terminals, respectively, in response to the detection of the address in the second address area by the bus control circuit.

10. The data processing system according to claim 9, wherein the data input/output circuit includes a data multiplexer circuit which is controlled by the processor unit when the bus control circuit provides the detection of the address in the first address area to the processor unit so that each of the first internal data lines and the second internal data lines are coupled to the first external data terminals in sequence and which is controlled by the processor unit when the bus control circuit provides the detection of the address in the second address area to the processor unit so that the first internal data lines and the second internal data lines are coupled to the first external data terminals and the second external data terminals, respectively.

11. The single-chip microcomputer according to claim 10, wherein the detection circuit includes a comparator circuit which compares the address signal provided from the processor unit with the address in the first address area.

* * * * *